Patented Oct. 14, 1952

2,614,050

UNITED STATES PATENT OFFICE 2,614,050

REFRACTORY COMPOSITIONS

Samuel Rusoff, Tiffin, Ohio, assignor to Basic Refractories, Inc., Cleveland, Ohio, a corporation of Ohio No Drawing. Application January 13, 1947, Serial No. 721,872

11 Claims. (Cl. 106—58)

Granular magnesia and/or chrome refractories have been quite commonly made up with sodium silicate as binder for the stages up to ultimate consolidation at elevated temperatures in a place of usage. Such compositions made up with dry sodium silicate, and then plasticized with water and put into final form, however, have had the very serious disadvantage that sodium silicate in general lessens the refractoriness of the final product, and in order to obtain the desired bonding it has been necessary to use amounts of the silicate running into undesirable diminutions of the refractoriness. Furthermore, the strength of the material after heating at intermediate temperatures, for instance from 800° F. to 2200° F., has been very deficient, the modulus of rupture, for example, after firing at 1600° F. falling off very seriously as compared with the modulus of rupture after drying at a temperature of 265° F. I have now found, however, that if the refractory material be made up to include an agent as described more particularly hereinafter, it is possible to apply refractory particles so as to attain greatly improved intermediate temperature strength of bond, and increased final refractoriness, as well as improved workability in the initial making up and molding. Also, more compact masses can be developed with lesser water contents.

To the accomplishment of the foregoing and related ends, the invention, then, comprises the features hereinafter fully described and particularly pointed out in the claims, the following description setting forth in detail certain illustrative embodiments of the invention, these being indicative however, of but a few of the various ways in which the principle of the invention may be employed.

The refractory materials which it is commonly desired to make up in plastic or moldable condition such as to be suitable for ramming, or applying to furnace linings generally, etc. may be employed, and thus, magnesia clinker, chrome ore, calcined chrome ore and mixtures of these, and such like, as used in the furnace lining industry, may be crushed to desired size. Generally, refractory particles of −4 mesh with gradually smaller sizes such as to fill the voids, for instance a substantial amount, or 25%, −200 mesh, is a satisfactory sizing.

With the refractory particles in desired fineness, there is incorporated a small amount of dry powdered material which for conciseness is hereinafter referred to as a "bond-promoting agent," and by which term is included agents providing a cyclic sulphonic compound, as acid or sulphonate. These are preferably aromatic, or at least it is desirable that some aromatic sulphonates be present, and they may be of benzene or naphthalene nucleus, and aryl, mixed alkyl-aryl or aryl-alkyl character. Sufficiently purified water-soluble sludge sulphonates thus derived from petroleum or tar sources may be applied. Polymerized alkali metal salts of the sulphonic acids of aryl-alkyl combinations are especially desirable. Polymerized sulphonic acids of aryl-alkyl combinations are likewise suitable. Mixtures of the aforementioned polymerized sulphonic acids with the afore-mentioned polymerized alkali metal salts are effective. Commercial products of this particular composition are available on the market. The amount of the bond-promoting agent will vary somewhat depending upon the particular field of usage in which the refractory composition is being applied. Generally, at least 0.3% is desirable, and the amount may range up to 2%, or in some cases even somewhat more up to 3%.

Heretofore where using sodium silicate it has been necessary to add sodium carbonate or the like in order to attain desirable strength, but with the present combination such additional alkali metal salts are eliminated, and as a consequence the refractoriness of the product is correspondingly increased.

With the materials as afore-stated, there is also made up a small per cent of dry sodium silicate, anhydrous or hydrous. This should be finely ground, for instance −35 mesh, and preferably finer, and desirably all should be −100 mesh and with a proportion −200 mesh. Ground anhydrous sodium silicate glass may be employed, or dried hydrated sodium silicate. Mixtures of ground sodium silicate glass and spray-dried hydrated sodium silicate are especially advantageous. The $Na_2O$ $SiO_2$ ratio in the sodium silicate is not particularly critical. The 1:3.25 grade is desirable. However, ratios of 1:2.5 to 3.5 give satisfactory results. About the only materially practical limitation is that higher alkaline ratios tend to set up more rapidly, and if the ratio is too high it may not permit adequate time for application of the refractory material in complicated positioning before setting undesirably occurs. Thus, the particular duty in view for the material can readily determine the sodium silicate to be used. As above indicated, mixtures of the hydrated and ground sodium silicate glass are desirable, and these respective kinds of dry silicate may in fact be applied in ranges varying from 0 to 100% of either. Ordinarily, it is preferable to use around 2 parts of powdered sodium silicate glass and 1 part of hydrated sodium silicate. The total amount of sodium silicate may generally range from 2 to 6%. Where the refractory material is to be used in relatively low temperature furnace duty, the range may be extended up to 8 or 10% without detriment. In general, however, a particular advantage of the present invention is that it makes possible the use of much less sodium silicate than would otherwise be feasible. This results in an increase in the refractoriness of the product.

With the materials thus mixed, the product can be conveniently handled and stored as a dry granular or pulverulent product, and at time of use may be tempered or plasticized with a small amount of water to working consistency desired. It may then be applied in furnace lining or repairing, or by ramming, etc. The material is desirably given a preliminary drying before firing.

Alternately, the bond prompting agent may be added to the water used for tempering the dry mixture of refractory particles and sodium silicate. Generally it has been found that the bond promoting agent reduces the water requirements with a resulting decreased porosity of the final product.

Generally illustrative products may involve the following: Refractory particles 90.0 to 97.0%, dry powdered bond-promoting agent 0.3 to 2.0%, and dry powdered sodium silicate 2.0 to 8%.

As an example: 95% of —4 mesh sintered magnesia clinker containing at least 25% —200 mesh, and 0.5% of dry powdered sodium salt of polymerized naphthalene sulphonic acid, and 4.5% of dry powdered silicate of soda (ratio 1:3.25) were thoroughly mixed, and about 6% of water was finally added for tempering. After proper mixing, some of the material was molded into test-bars 7" x 2" x 1", by ramming under 50 pounds air pressure. The test-bars were dried for 18 hours at 265° F., some were tested for modulus of rupture at this temperature, and others were fired to 1600° F. and tested. The modulus of rupture after drying at 265° F. was 1600 p. s. i., and after firing at 1600° F. the modulus of rupture was 2100 p. s. i. This, as noticed, is remarkable in that the bond strength was greater at the higher temperature, instead of less as is usual with mixtures containing sodium silicate.

In the same manner, polymerized naphthalene sulphonic acid per se is used instead of the salt, with magnesia and with chrome ore.

As another example: 60 per cent of —4 mesh sintered magnesia clinker and 35% of magnesia clinker containing 60% of 200 mesh, were mixed with 0.5% of dry powdered polymerized sodium aryl-alkyl naphthalene sulphonate, and 3% of dry powdered sodium silicate, and 1.5% of spray-dried powdered sodium silicate. After thoroughly mixing, about 7.5% of water was added and the material was plasticized and ready for application at point of use.

As another example: 96.5% of —4 mesh chrome ore, 0.5% of dry powdered sodium salt of polymerized aryl-alkyl naphthalene sulphonic acid, and 3% of dry powdered silicate of soda were thoroughly mixed. The material was maintained in dry state until ready for use at point of application, the addition of sufficient water for plasticizing being then the only further treatment required.

The modus operandi or mechanism of the action of the bond-promoting agent is not understood. Its result of giving great strength after drying and high strengths after firing at intermediate temperature instead of the customary decrease where sodium silicate alone is included, is remarkable and wholly unexpected; and this coupled with the cutting down of amounts of sodium silicate usable and the consequent ultimate increase of refractoriness, together with the lessened amount of water requisite to develop improved workability for initial application of the refractory material, are important. That the action is quite distinct from that of a mere wetting agent or dispersing agent is evidenced by the fact that certain common typical wetting and dispersing agents do not give the result. The amounts operative are seen to be in catalytic range.

Other modes of applying the principle of the invention may be employed, change being made as regards the details described, provided the features stated in any of the following claims, or the equivalent of such be employed.

I therefore particularly point out and distinctly claim as my invention:

1. A refractory composition, consisting of refractory particles and a non-refractory inorganic binder, together with an agent raising the intermediate temperature strength of the latter comprising 0.3–3.0 per cent of a water-dispersible agent of the group consisting of sulphonic acid and sulphonate compounds including a cyclic radical, said non-refractory inorganic binder being sodium silicate in amount not over about ten per cent.

2. A refractory, comprising magnesia particles and not over about ten per cent of sodium silicate, tempered with water containing an alkali metal salt of a polymerized aryl-alkyl sulphonic acid in amount not over about three per cent.

3. A refractory, comprising refractory particles and not over about ten per cent of sodium silicate, tempered with water containing a smaller amount of bond-promoting agent providing a water-dispersible cyclic sulphonic compound in amount not over about three per cent.

4. A refractory composition, consisting of refractory particles and a non-refractory inorganic binder, together with an agent raising the intermediate temperature strength of the latter comprising 0.3–3.0 per cent of a water-dispersible agent of the group consisting of sulphonic acid and sulphonate compounds including a cyclic radical, said refractory particles being magnesia clinker, and said non-refractory inorganic binder beng sodium silicate in amount not over about ten per cent.

5. A refractory composition, consisting of refractory particles and a non-refractory inorganic binder, together with an agent raising the intermediate temperature strength of the latter comprising 0.3–3.0 per cent of a water-dispersible agent of the group consisting of sulphonic acid and sulphonate compounds including a cyclic radical, said refractory particles being chrome ore, and said non-refractory inorganic binder being sodium silicate in amount not over about ten per cent.

6. A refractory composition, consisting of refractory particles and a non-refractory inorganic binder, together with an agent raising the intermediate temperature strength of the latter comprising 0.3–3.0 per cent of a water-dispersible agent of the group consisting of sulphonic acid and sulphonate compounds including a cyclic radical, said non-refractory inorganic binder being 2-8 per cent of finely divided dry sodium silicate.

7. A refractory composition, consisting of refractory particles and a non-refractory inorganic binder, together with an agent raising the intermediate temperature strength of the binder comprising 0.3-3.0 per cent of a water-dispersible agent of the group consisting of sulphonic acid and sulphonate compounds including a cyclic radical, said refractory particles being magnesia clinker, and said non-refractory inorganic binder being 2-8 per cent of finely divided dry sodium silicate.

8. A refractory composition, consisting of refractory particles and a non-refractory inorganic binder, together with an agent raising the intermediate temperature strength of the binder comprising 0.3-3.0 per cent of a water-dispersible agent of the group consisting of sulphonic acid and sulphonate compounds including a cyclic radical, said refractory particles being chrome ore, and said non-refractory inorganic binder being 2-8 per cent of finely divided dry sodium silicate.

9. A refractory composition, consisting of refractory particles and a non-refractory inorganic binder, together with an agent raising the intermediate temperature strength of the binder comprising 0.3-3.0 per cent of a water-dispersible agent of the group consisting of sulphonic acid and sulphonate compounds including a cyclic radical, said non-refractory inorganic binder being 2-6 per cent of a mixture of powdered anhydrous sodium silicate and dry hydrate sodium silicate.

10. A refractory composition, consisting of refractory particles and a non-refractory inorganic binder, together with an agent raising the intermediate temperature strength of the binder comprising 0.3-3.0 per cent of a water-dispersible agent of the group consisting of sulphonic acid and sulphonate compounds including a cyclic radical, said refractory particles being magnesia clinker, and said non-refractory inorganic binder being 2-6 per cent of a mixture of powdered anhydrous sodium silicate and dry hydrate sodium silicate.

11. A refractory composition, consisting of refractory particles and a non-refractory inorganic binder, together with an agent raising the intermediate temperature strength of the binder comprising 0.3-3.0 per cent of a water-dispersible agent of the group consisting of sulphonic acid and sulphonate compounds including a cyclic radical, said refractory particles being chrome ore, and said non-refractory inorganic binder being 2-6 per cent of a mixture of powdered anhydrous sodium silicate and dry hydrate sodium silicate.

SAMUEL RUSOFF.

REFERENCES CITED

The following references are of record in the file of this patent:

UNITED STATES PATENTS

| Number | Name | Date |
| --- | --- | --- |
| 2,004,545 | Wolf et al. | June 11, 1935 |
| 2,406,909 | Schoenlaub | Sept. 3, 1946 |
| 2,407,725 | Schoenlaub | Sept. 17, 1946 |

FOREIGN PATENTS

| Number | Country | Date |
| --- | --- | --- |
| 573,410 | Great Britain | Nov. 20, 1945 |

OTHER REFERENCES

Ser. No. 382,101, Passelecq et al. (A. P. C.), published May 11, 1943.